E. B. DURNEY AND C. V. REISTER.
SIGNAL DEVICE FOR AUTO TIRES.
APPLICATION FILED MAY 18, 1920.
1,411,714.
Patented Apr. 4, 1922.
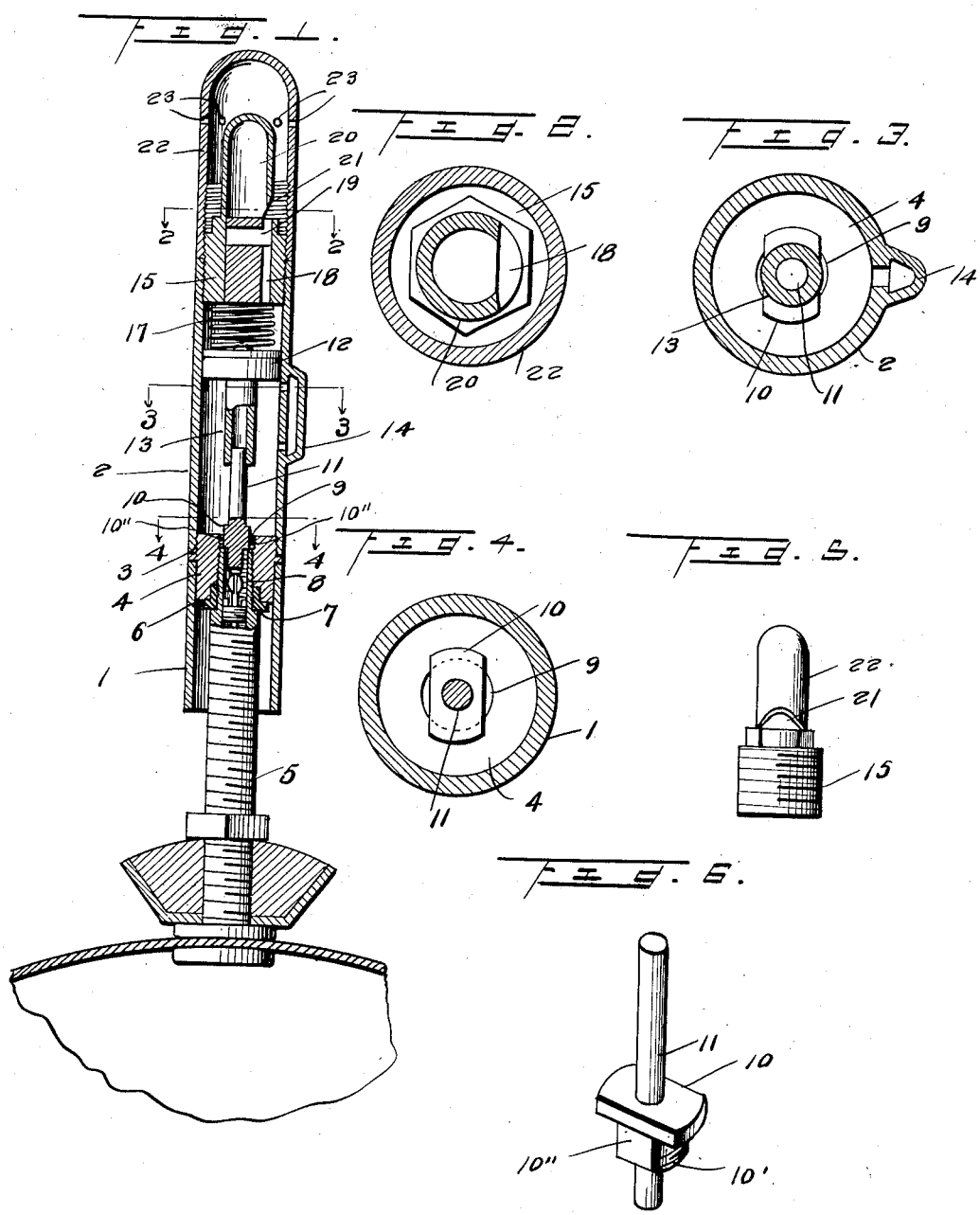
INVENTOR.
C. V. Reister
E. B. Durney
BY
ATTORNEY.

UNITED STATES PATENT OFFICE.

EUGENE B. DURNEY AND CHARLES V. REISTER, OF SILVERBELL, ARIZONA.

SIGNAL DEVICE FOR AUTO TIRES.

1,411,714. Specification of Letters Patent. Patented Apr. 4, 1922.

Application filed May 18, 1920. Serial No. 382,286.

*To all whom it may concern:*

Be it known that we, EUGENE B. DURNEY and CHARLES V. REISTER, citizens of the United States, residing at Silverbell, in the county of Pinal and State of Arizona, have invented certain new and useful Improvements in a Signal Device for Auto Tires; and we do hereby declare the following to be a full, clear, and exact description of the invention, such as will enable others skilled in the art to which it appertains to make and use the same.

This invention relates to signal devices adapted to be applied to automobile tires and it consists in the novel features hereinafter described and claimed.

An object of the invention is to provide a device of the character stated which is of simple and durable structure and adapted to be applied to the nipple of a tire and which will give forth an audible signal in the event that the valve which is located in the nipple should leak and permit the air to escape from the tire.

With the above object in view, the device comprises a barrel adapted to be connected with the nipple of the tire and having a piston slidably mounted therein with means for limiting the sliding movement of the piston. The barrel is provided at its side with a by-pass and the piston, when not subjected to the air pressure from the interior of the tire, is forced by means of a spring which is located in the barrel to a position between the ends of the by-pass whereby the air from the tire may pass around the piston. A whistle is mounted upon the barrel and the air which passes around the piston and through the by-pass, passes through the whistle and causes the same to give forth an audible sound. A means is provided for regulating the tension of the spring whereby it will move the piston when the air pressure against the same is reduced to a degree and which is over-come by the tension of the spring. A cap is mounted upon the barrel and is provided with openings through which the sound may travel from the whistle.

In the accompanying drawing:

Figure 1 is a vertical sectional view of the signal.

Fig. 2 is a sectional view taken on the line 2—2 of Fig. 1.

Fig. 3 is a similar view taken on the line 3—3 of Fig. 1.

Fig. 4 is a similar view taken on the line 4—4 of Fig. 1.

Fig. 5 is a detail view of the whistle and its attaching means.

Fig. 6 is a detail view of the valve rod.

The signal device comprises a barrel which is composed of sections 1 and 2 permanently joined together at their adjacent ends as at 3 by means of solder or other suitable agency. The section 1 is provided in its interior with an abutment portion 4 in which the ends of the valve nipple 5 is adapted to be screwed there being a tacking washer 6 interposed between the lower surface of the shoulder 4 and the shoulder 7 upon the the nipple. The nipple 5 carries a spring-pressed valve 8 of usual suction and the nipple passes through the rim of the wheel and communicates at its outer end with the interior of the tire in the usual manner. The shoulder portion 4 is provided with a centrally located passageway 9 which receives the end of the stem of the valve 8 and a stop block 10 is disposed transversely across the upper end of the passage way 9. The block 10 is provided with flattened sides 10″ and with curved ends 10′ which are threaded for engagement with a thread in the shoulder portion 4 whereby the said block is held in position in the said portion. A rod 11 passes through the stop block 10 and is secured thereto and the lower end of the rod 11 is adapted to engage the upper end of the stem of the valve 8 when the nipple 5 is connected with the shoulder portion 4 whereby the valve 8 is moved away. A piston 12 is slidably mounted in the section 2 of the barrel and carries at its lower side a centrally positioned sleeve 13 which is adapted to receive the upper portion of the rod 11 and the lower end of the sleeve 13 may engage the stop block 10 thus limiting the movement of the piston 12 in one direction. The section 2 is provided at its side with a by-pass passage way 14 and the piston 12 may move from a point beyond the ends of the by-pass 14 to a point between the ends thereof. A block 15 is screw threaded in the upper end of the section 2 and may be provided at its side with a series of graduations 16 which will indicate the extent to which the lower portion of the block 15 is inserted in the section 2. A coil spring 7 is interposed between the lower surface of the block 15 and the upper surface of the piston 12 and is under tension with a tendency to normally hold the piston 12 at a point between the ends of the by-pass 14.

The block 15 is provided with a duct 18 which passes vertically through the same and which communicates at its upper end with a socket 19 provided in the upper portion of the block. A whistle 20 is inserted in the socket 19 and its lip 21 is located directly opposite the upper end of the duct 18. A cap 22 is adapted to be screwed upon the upper portion of the block 15 whereby the whistle 20 is enclosed and the cap is provided at its side with a series of openings 23 through which the sound from the whistle may pass when it is sounded.

The operation of the device is as follows: When the barrel is applied to the nipple of the valve the lower end of the rod 11 comes in contact with the stem of the valve in the nipple and moves the valve to an open position in the nipple therefor the air from the tire may pass through the nipple 5, the passage way 9 and impinge again the under side of the piston 12 and moves the piston to a point beyond the upper end of the by-pass 14 whereby the spring 17 is compressed between the piston and the block 13. The piston 12 remains at this position so long as the air pressure in the tire remains at normal. In the event that the tire should become punctured or a leak should occur at the valve the pressure in the tire is reduced and under the tension of the spring 17 the piston 12 is moved to a position between the ends of the by-pass 14 whereby the air from the tire and which is within the section 2 of the barrel passes through the by-pass 14 and enters the section 2 at a point above the upper surface of the piston 12. This air passes through the duct 18 and sounds the whistle 20 by being split at the lip 21 thereof. The sound from the whistle passes out through the openings 23 of the cap 22 and consequently one who is in the vicinity of the device is warned that a leak is incurring in the tire. It is apparent that by adjusting the block 15 in the section 2 of the barrel and by noting the graduations 16 the tension of the spring 17 may be increased or diminished to a certain predetermined degree whereby the piston 12 may act promptly upon being relieved of its support of a column of air or may be retarded in its movement or varying upon the degree of tension to which the spring 17 is adjusted.

From the foregoing description taken in conjunction with the accompanying drawing it will be seen that a signal device, adapted to be applied to the nipple of an automobile tire and a simple and durable structure is provided and that the same may be used to advantage for giving a warning or signal when a leak occurs in a tire.

Having thus described our invention, what we claim is:—

A tire valve alarm device comprising a casing, a block therein threaded to the valve stem, a stud to hold the valve stem open having an enlargement threaded to said block above the valve stem, said enlargement being cut away to permit escape of air through the valve, a pin on the stud extending above said blocks, a piston movably mounted on the stud to normally prevent escape of air, an alarm, a spring to urge movement of the piston upon decrease of air pressure and means whereby air may by-pass the piston under the latter condition to cooperate with the alarm.

In testimony whereof we affix our signatures in presence of two witnesses.

EUGENE B. DURNEY.
CHARLES V. REISTER.

Witnesses:
FRED BOLZ,
R. D. ST. LOUIS.